(12) United States Patent
Choi (10) Patent No.: US 7,305,250 B2
(45) Date of Patent: Dec. 4, 2007

(54) APPARATUS AND METHOD FOR SIMULTANEOUSLY PERFORMING A TV RECEPTION FUNCTION AND A CALLING FUNCTION IN A MOBILE PHONE

(75) Inventor: Taek-Kyun Choi, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 513 days.

(21) Appl. No.: 10/807,298

(22) Filed: Mar. 24, 2004

(65) Prior Publication Data
US 2004/0259594 A1 Dec. 23, 2004

(30) Foreign Application Priority Data
Apr. 22, 2003 (KR) .................. 10-2003-0025429

(51) Int. Cl.
| | |
|---|---|
| H04B 1/18 | (2006.01) |
| H04Q 7/20 | (2006.01) |
| H04M 1/00 | (2006.01) |
| H04N 5/225 | (2006.01) |
| H04N 5/64 | (2006.01) |

(52) U.S. Cl. .................. 455/550.1; 455/180.1; 455/425; 348/376; 348/838
(58) Field of Classification Search .......... 455/414.1, 455/556.1, 425, 550.1, 553.1, 552.1, 180.1, 455/188.1, 82, 83, 118.1; 348/838, 376, 348/375
See application file for complete search history.

(56) References Cited

U.S. PATENT DOCUMENTS

| | | | | |
|---|---|---|---|---|
| 5,926,479 A | * | 7/1999 | Baran ................ | 370/395.61 |
| 6,298,224 B1 | * | 10/2001 | Peckham et al. ...... | 455/188.1 |
| 6,718,157 B1 | * | 4/2004 | Choi .................... | 455/3.01 |
| 6,754,508 B1 | * | 6/2004 | Pau ..................... | 455/552.1 |
| 6,973,304 B2 | * | 12/2005 | Fujise et al. ......... | 455/422.1 |
| 6,993,357 B1 | * | 1/2006 | Ito et al. .............. | 455/552.1 |
| 7,046,716 B1 | * | 5/2006 | Miao .................... | 375/130 |
| 2002/0111187 A1 | * | 8/2002 | Harada et al. ........ | 455/553 |
| 2004/0248624 A1 | * | 12/2004 | Leclercq .............. | 455/574 |

FOREIGN PATENT DOCUMENTS

| | | |
|---|---|---|
| CN | 1219319 A | 6/1999 |
| JP | 2002-159051 | 5/2002 |
| JP | 2003-032140 | 1/2003 |
| WO | WO9839906 | 9/1998 |

* cited by examiner

Primary Examiner—Quochien B. Vuong
Assistant Examiner—Andrew Wendell
(74) Attorney, Agent, or Firm—Roylance, Abrams, Berdo & Goodman, L.L.P.

(57) ABSTRACT

A method and apparatus is provided to simultaneously perform a TV reception function and a calling function in a multimode mobile phone supporting two or more communication services. The apparatus comprises a first RF switch separating a received signal into N communication services; M diplexers associated with the communication services, for separating a signal received from the first RF switch into a call signal and a TV signal; a second RF switch for applying the TV signal received from the diplexers to a TV tuner; and a controller for controlling an overall operation of the multimode mobile phone and controlling the first RF switch and the second RF switch according to the received signal.

24 Claims, 11 Drawing Sheets

APPARATUS AND METHOD FOR SIMULTANEOUSLY PERFORMING A TV RECEPTION FUNCTION AND A CALLING FUNCTION IN A MOBILE PHONE

PRIORITY

This application claims priority under 35 U.S.C. § 119 to an application entitled "Apparatus and Method for Simultaneously Performing TV Reception Function and Calling Function in a Mobile Phone" filed in the Korean Intellectual Property Office on Apr. 22, 2003 and assigned Ser. No. 2003-25429, the contents of which are incorporated herein by reference.

BACKGROUND OF THE INVENTION

1. Field of the Invention

The present invention relates generally to a mobile terminal such as a mobile phone, and in particular, to an apparatus and method for simultaneously performing a Television (TV) reception function and a calling function in a mobile phone capable of supporting two or more communication services.

2. Description of the Related Art

In general, a mobile phone supporting Personal Communications Service (PCS) technology, Code Division Multiple Access (CDMA) technology and Global Positioning System (GPS) is called a "tri-mode phone," and can provide a mobile communication service in different modes.

In the tri-mode phone, currently available communication services are classified into a CDMA service having a frequency band of 824 MHz to 894 MHz, a GPS service having a frequency band of 1575.42 MHz, and a PCS service having a frequency band of 1851 MHz to 1989 MHz. A transceiver circuit is included in the tri-mode phone to provide these services.

Figure 1:
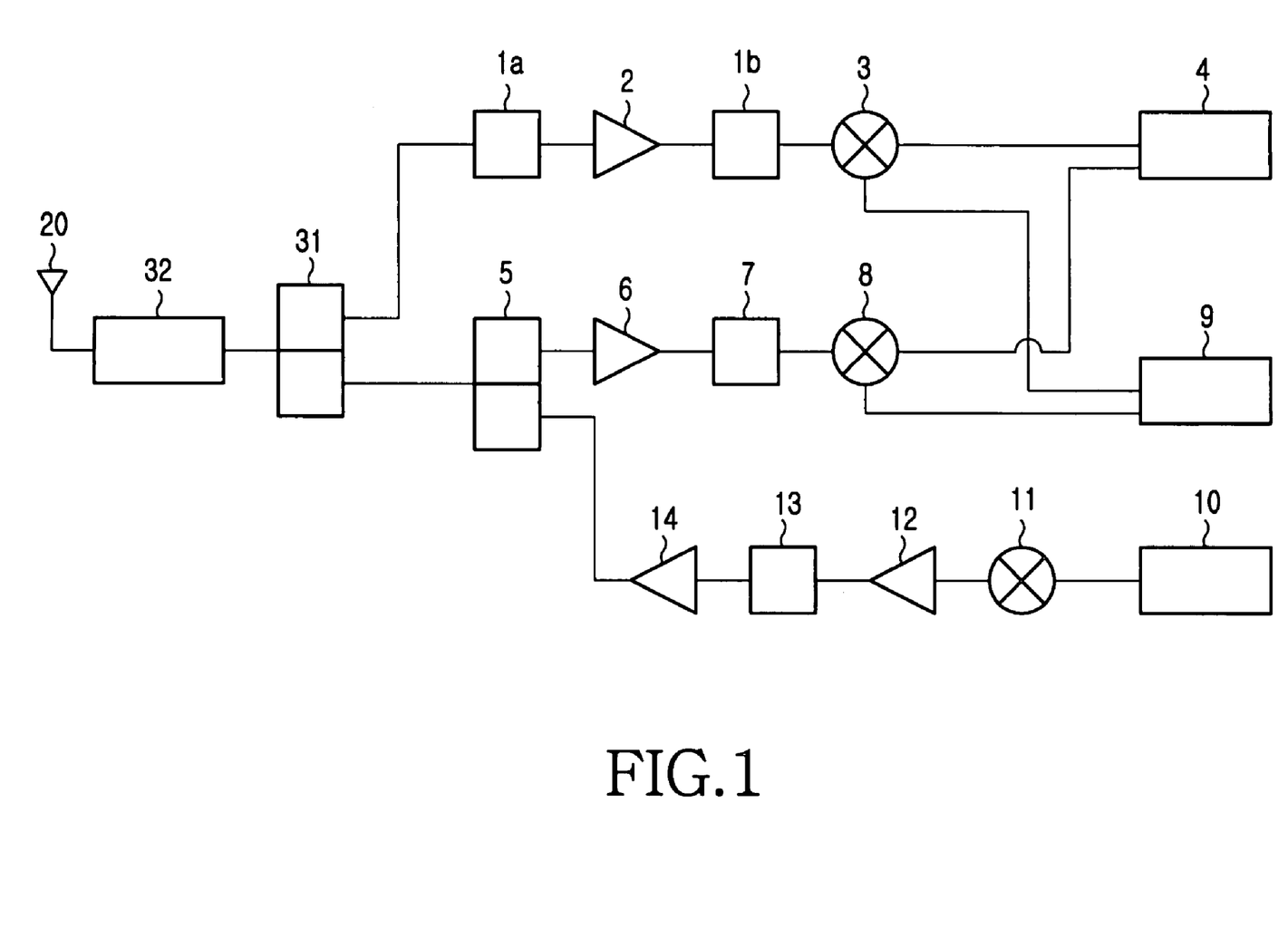
FIG. 1 is a block diagram illustrating an example of a tri-mode phone according to the prior art.

FIG. 1 is a block diagram illustrating an example of a transceiver circuit of a conventional tri-mode phone, which separates a GPS signal and a CDMA signal using a diplexer. As illustrated in FIG. 1, the transceiver circuit of a tri-mode phone supporting the CDMA, GPS and PCS services includes first and second GPS band filters 1a and 1b for filtering a GPS band frequency, a GPS band low-nose-amplifier 2 for amplifying the filtered GPS band frequency, a GPS band frequency-down mixer 3, a digital demodulation Integrated Circuit (IC) 4 for reception, a duplexer 5 for separation of a transmission signal and a reception signal, a CDMA band low-noise amplifier 6, a CDMA reception band filter 7, a CDMA band frequency-down mixer 8, a phase locked loop (PLL) circuit 9 for synthesis of a GPS band local frequency signal and a CDMA band local frequency signal, a digital modulation IC 10 for transmission, a CDMA band frequency-up mixer 11, a CDMA band output amplifier 12, a CDMA transmission band filter 13, and a CDMA band high-power amplifier 14. In addition, the tri-mode phone includes a diplexer 31, an antenna matching circuit 32, and an antenna 20 having two frequency band characteristics of GPS and CDMA. A separate antenna must be added to the tri-mode phone in order to enable the phone to perform a TV reception function. However, the addition of a separate antenna increases a size of the product and impairs its external appearance. Accordingly, there is a demand for a tri-mode phone capable of enabling a user to talk on the phone while watching TV without the addition of a separate antenna.

SUMMARY OF THE INVENTION

It is, therefore, an object of the present invention to provide an apparatus and method for simultaneously performing a TV reception function and a calling function in a mobile phone providing two or more communication services.

To achieve the above and other objects, there is provided an apparatus for simultaneously performing a TV reception function and a calling function in a multimode mobile phone supporting two or more communication services. The apparatus comprises a first Radio Frequency (RF) switch for separating a received signal into N communication services; M diplexers associated with the communication services, for separating a signal received from the first RF switch into a call signal and a TV signal; a second RF switch for applying the TV signal received from the diplexers to a TV tuner; and a controller for controlling an overall operation of the multimode mobile phone and controlling the first RF switch and the second RF switch according to the received signal.

To achieve the above and other objects, there is provided a method for simultaneously performing a TV reception function and a calling function in a multimode mobile phone supporting two or more communication services. The method comprises the steps of separating a received signal into a corresponding communication service; separating the communication service into a call signal and a TV signal, and performing a calling function or a TV reception function.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will now be described in detail with reference to the accompanying drawings. In the following description, a detailed description of known functions and configurations has been omitted for conciseness.

In the following description, specific details such as the type of RF switch and a signal separated by a diplexer are provided to give a better understanding of the invention. However, the embodiment of the present invention should not be limited to the specific examples disclosed herein. Thus, it would be apparent to those skilled in the art that the invention can be implemented without the specific details or through a modification thereof.

Although an embodiment of the present invention will be described herein with reference to a tri-mode phone capable of supporting Code Division Multiple Access (CDMA), Personal Communications Service (PCS), and Global Positioning System (GPS) services, the embodiments of the invention can be applied to a multimode mobile phone supporting various communication services including a Global System for Mobile communication (GSM) service as well as the CDMA, PCS and GPS services. In the embodiment of the present invention, it will be assumed that a calling function is performed when a PCS signal is received at a PCS duplexer in a PCS mode, and also the calling function is performed when a CDMA signal is received at a CDMA duplexer in a CDMA mode. In addition, it will be assumed that a GPS function is performed when a GPS signal is received at a GPS RF switch in a GPS mode, and a TV reception function is performed when a TV signal is received at a TV tuner. It should be appreciated by those skilled in the art that the TV signal comprises an audio and video signal, and a tuner which will be described below can selectively tune to a particular channel.

An embodiment of the present invention will now be described in detail with reference to the accompanying drawings.

Figure 2:
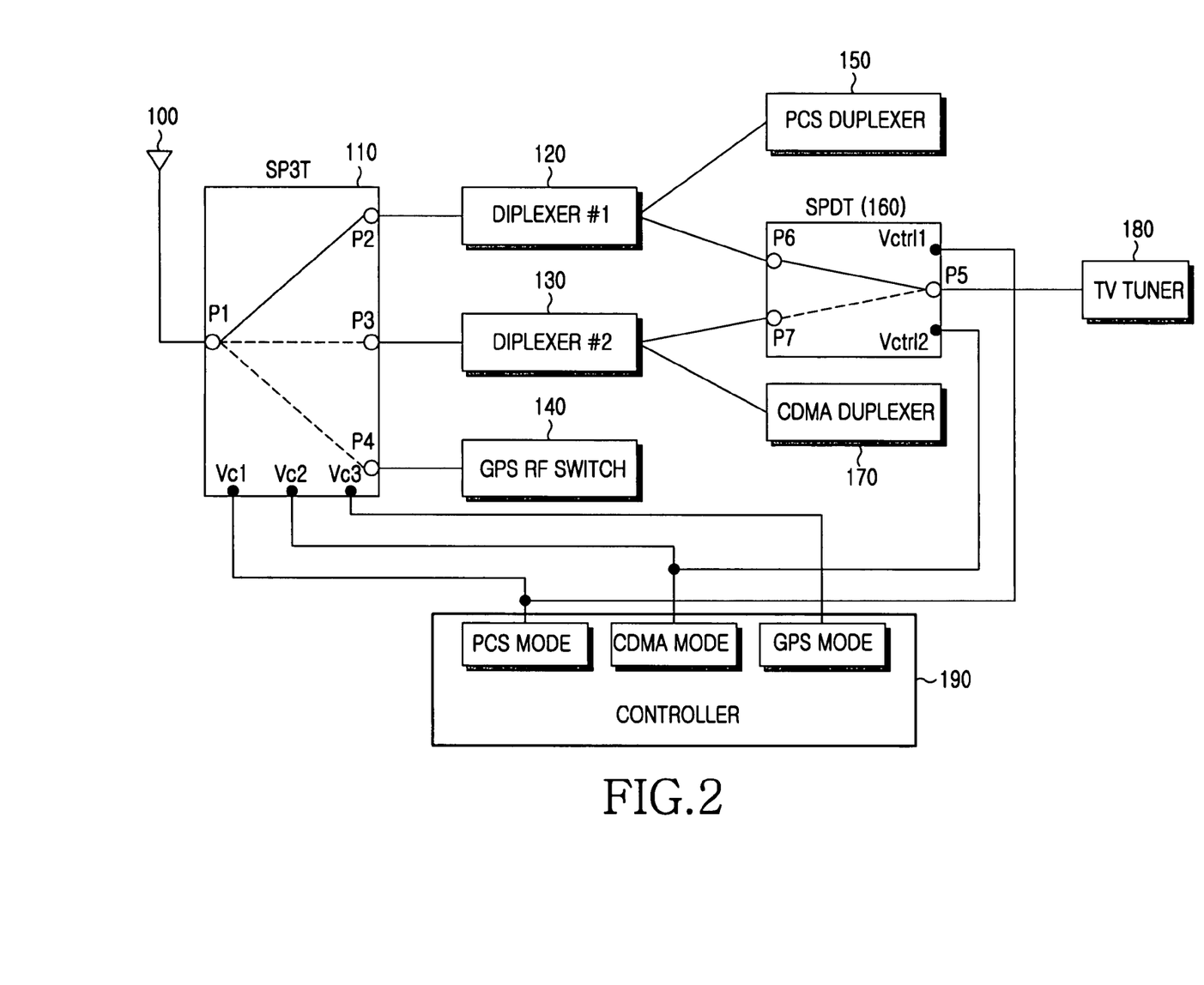
FIG. 2 is a block diagram illustrating an example of a tri-mode phone according to an embodiment of the present invention.
Figure 4A:
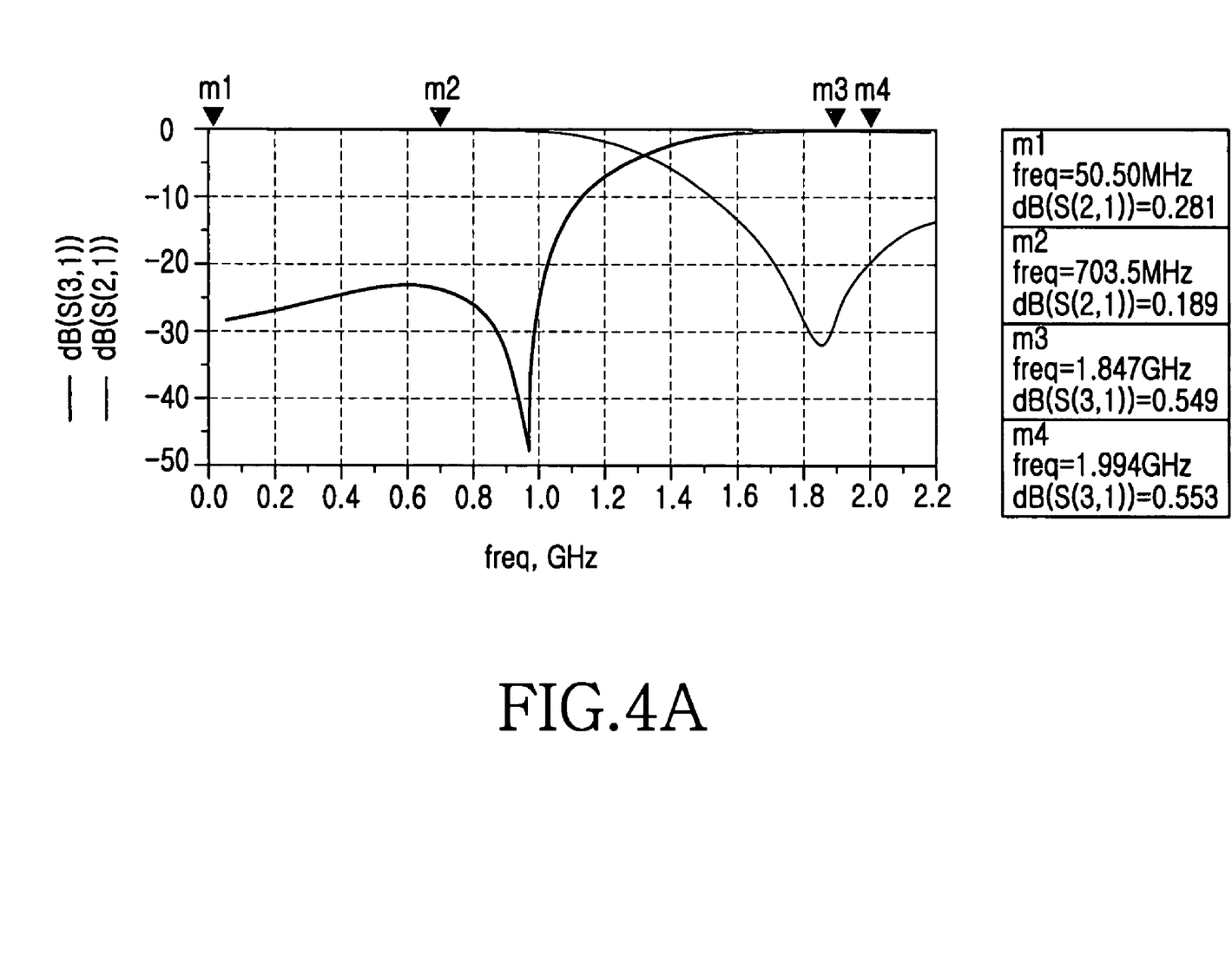
FIG. 4A is a graph illustrating an example of insertion loss of the first diplexer in FIG. 2 according to an embodiment of the present invention.
Figure 4B:
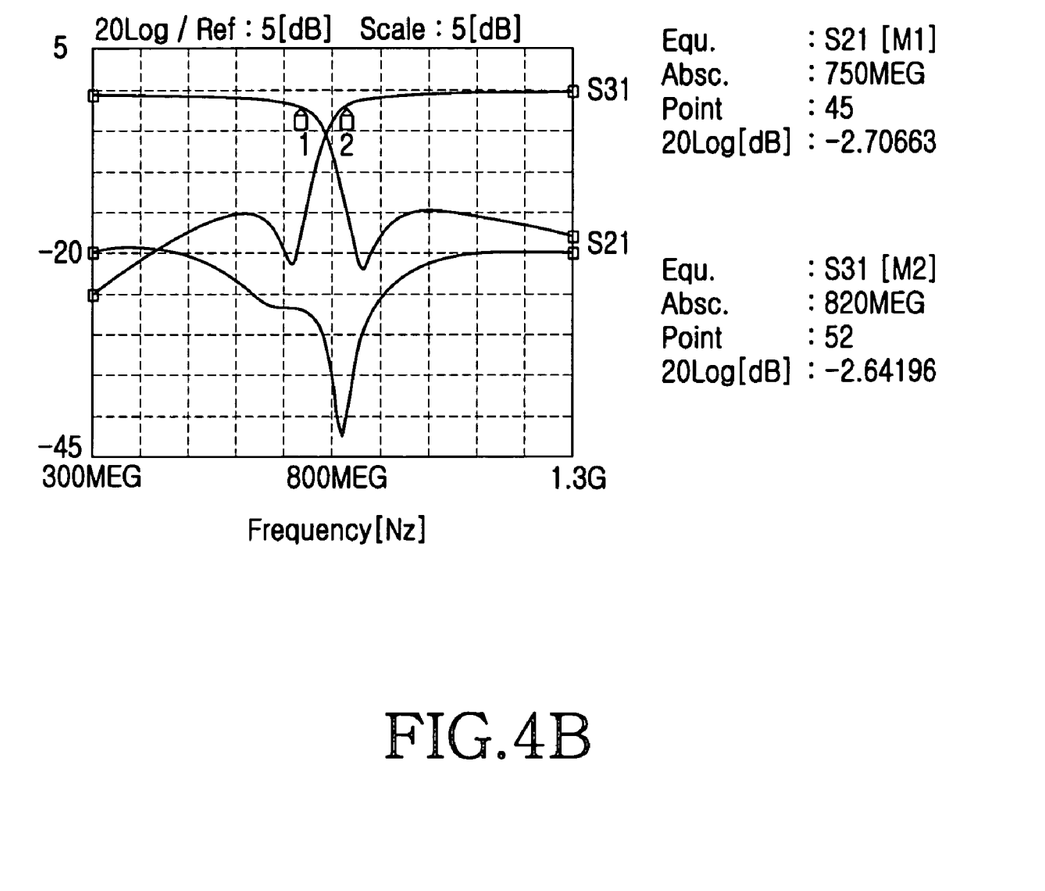
FIG. 4B is a graph illustrating an example of insertion loss of the second diplexer in FIG. 2 according to an embodiment of the present invention.

FIG. 2 is a block diagram illustrating an example of a structure of a tri-mode phone according to an embodiment of the present invention. FIGS. 4A and 4B are graphs illustrating examples of insertion losses of the first and second diplexers in FIG. 2, respectively according to embodiments of the present invention.

Referring to FIG. 2, a first Radio Frequency (RF) switch 110 is a single-pole-three-throw (SP3T) type switching circuit having one input port P1, three output ports P2, P3 and P4, and three control ports Vc1, Vc2 and Vc3. In the first RF switch 110, the input port P1 is connected to an antenna 100, and the output ports P2, P3 and P4 are connected to a first diplexer 120, a second diplexer 130, and a GPS RF switch 140, respectively. The control ports Vc1, Vc2 and Vc3 are controlled by a controller 190. When only the control port Vc1 is provided with a 'High' signal while the other control ports Vc2 and Vc3 are provided with a 'Low' signal, the input port P1 is switched to the output port P2 connected to the first diplexer 120. When only the control port Vc2 is provided with a 'High' signal while the other control ports Vc1 and Vc3 are provided with a 'Low' signal, the input port P1 is switched to the output port P3 connected to the second diplexer 130. In addition, when only the control port Vc3 is provided with a 'High' signal while the other control ports Vc1 and Vc2 are provided with a 'Low' signal, the input port P1 is switched to the output port P4 connected to the GPS RF switch 140.

Figure 3A:
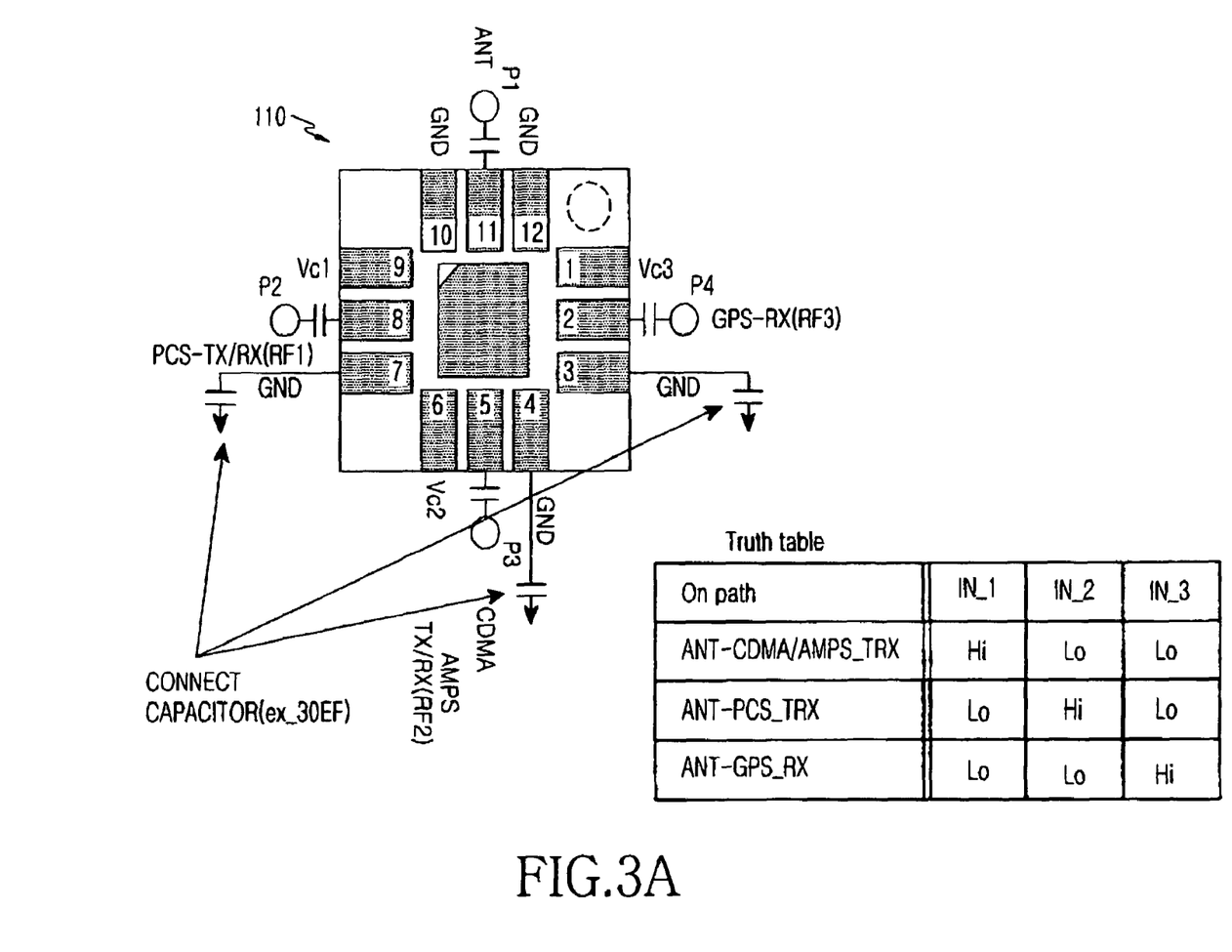
FIG. 3A is a block diagram illustrating an example of a detailed structure of the first RF switch in FIG. 2 according to an embodiment of the present invention.

An embodiment of the present invention will now be described with reference to FIG. 3A. FIG. 3A is a block diagram illustrating an example of a detailed structure of the first RF switch in FIG. 2 according to an embodiment of the present invention Specifically, FIG. 3A shows a detailed structure of the SP3T-type first RF switch 110 having one input port P1, three output ports P2 to P4, and three control ports Vc1, Vc2 and Vc3.

Referring to FIG. 2, the first diplexer 120 separates a received RF signal. Specifically, in an embodiment of the present invention, the first diplexer 120 separates a PCS signal assigned a frequency of 1851 to 1989 MHz and a TV signal assigned a frequency of 50 to 700 MHz, and is comprised of a low-pass filter and a high-pass filter. When the tri-mode phone is set to a PCS mode, a signal received from the antenna 100 is switched to the first diplexer 120 by the first RF switch 110 and then separated by the first diplexer 120. If the separated signal is a PCS signal, the PCS signal is applied to a PCS duplexer 150 to perform a calling function, and if the separated signal is a TV signal, the TV signal is applied to a TV tuner 180 via a second RF switch 160 to perform a TV reception function. The TV reception function can include enabling black and white or color TV viewing on a mobile phone. As is known, the tuner 180 is used to select a desired channel and to scan channels. Referring to FIG. 4A, insertion loss occurring in the first diplexer 120 is used to separate a PCS signal and a TV signal. As shown in FIG. 4A m1 and m2 represent insertion loss of a TV band signal, and m3 and m4 represent insertion loss of a PCS band signal. It is noted from FIG. 4A that the first diplexer 120 used for separation of a PCS signal and a TV signal has low insertion loss.

Referring to FIG. 2, the second diplexer 130 separates a received RF signal. In the embodiment of the present invention, the second diplexer 130 separates a CDMA signal assigned a frequency of 824 to 894 MHz and a TV signal assigned a frequency of 50 to 700 MHz, and is comprised of a low-pass filter and a high-pass filter. When the tri-mode phone is set to a CDMA mode, a signal received from the antenna 100 is switched to the second diplexer 130 by the first RF switch 110, and the second diplexer 130 separates the received signal and the received signal is then separated by the second diplexer 130. If the separated signal is a CDMA signal, the CDMA signal is applied to a CDMA duplexer 170 for separation of a transmission signal and a reception signal to perform a calling function. If the separated signal is a TV signal, the TV signal is applied to the TV tuner 180 via the second RF switch 160 to perform a TV reception function. Shown in FIG. 4B is insertion loss occurring in the second diplexer 130 used for separation of a CDMA signal and a TV signal. In FIG. 4B, M1 represents insertion loss of a TV band signal, and M2 represents insertion loss of a CDMA band signal. It is noted from FIG. 4B that the second diplexer 130 used for separation of a CDMA signal, and a TV signal has low insertion loss.

The second RF switch 160 is a single-pole-double-throw (SPDT) type switching circuit having one input port P5, two output ports P6 and P7, and two control ports Vctrl1 and Vctrl2. In the second RF switch 160, the input port P5 is connected to the TV tuner 180, and the output ports P6 and P7 are connected to the first diplexer 120 and the second diplexer 130, respectively. The control ports Vctrl1 and Vctrl2 are controlled by the controller 190. When the control port Vctrl1 is provided with a 'High' signal while the other control port Vctrl2 is provided with a 'Low' signal, the input port P5 is switched to the output port P6 connected to the first diplexer 120. In contrast, when the control port Vctrl2 is provided with a 'High' signal while the other control port Vctrl1 is provided with a 'Low' signal, the input port P5 is switched to the output port P7 connected to the second diplexer 130.

Figure 3B:
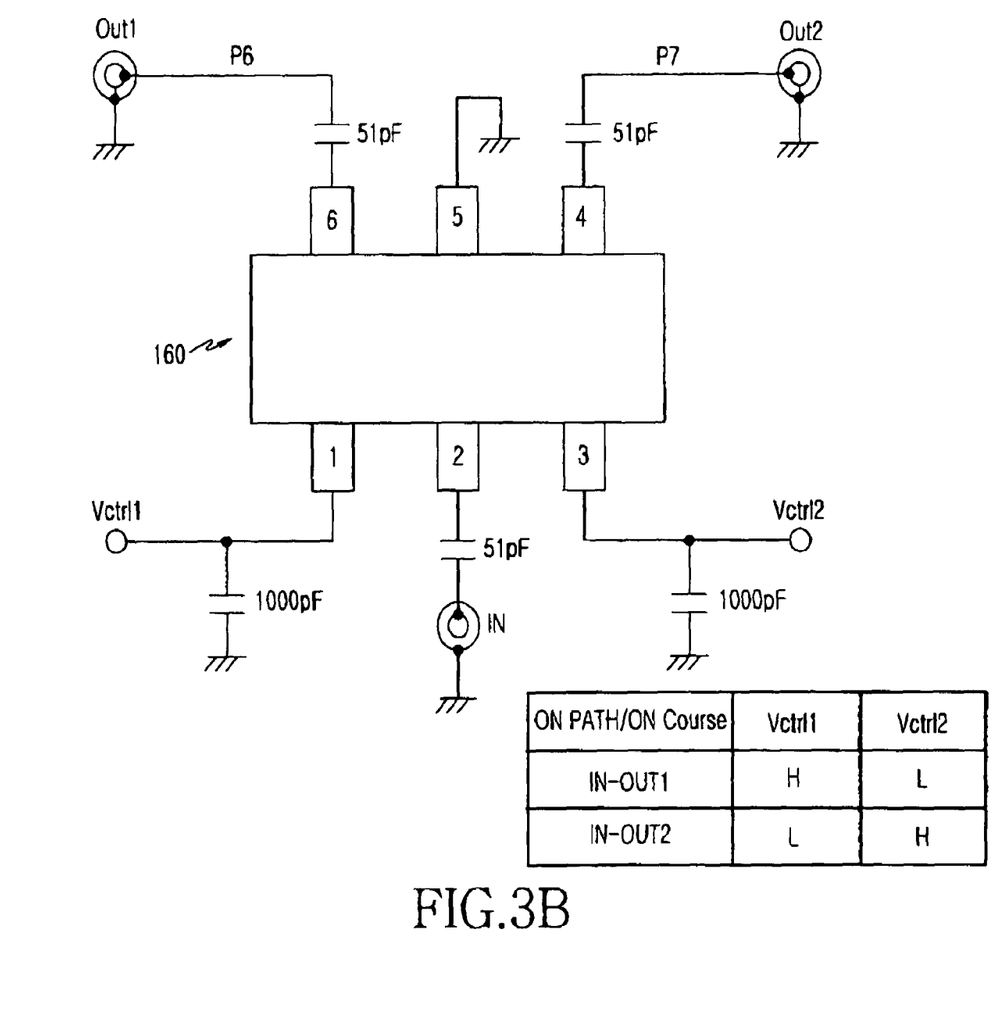
FIG. 3B is a block diagram illustrating an example of a detailed structure of the second RF switch in FIG. 2 according to an embodiment of the present invention.

An embodiment of the invention will now be discussed with reference to FIG. 3B. FIG. 3B is a block diagram illustrating an example of a detailed structure of the second RF switch in FIG. 2 according to an embodiment of the present invention. Specifically, FIG. 3B is a detailed structure of the SPDT-type second RF switch 160 having one input port P5, two output ports P6 and P7, and two control ports Vctrl1 and Vctrl2.

Referring to FIG. 2, the controller 190 controls the overall operation of the tri-mode phone. According to an embodiment of the present invention, if the tri-mode phone is set to a PCS mode, the controller 190 sets the control port Vc1 of the first RF switch 110 to 'High' and sets the other control ports Vc2 and Vc3 to 'Low' so that the first RF switch 110 is switched to the first diplexer 120. In addition, the controller 190 sets the control port Vctrl1 of the second RF switch 160 to 'High' and sets the other control port Vctrl2 to 'Low' so that the second RF switch 160 is switched to the first diplexer 120.

If the tri-mode phone is set to a CDMA mode, the controller 190 sets the control port Vc2 of the first RF switch 110 to 'High' and sets the other control ports Vc1 and Vc3 to 'Low' so that the first RF switch 110 is switched to the second diplexer 130. In addition, the controller 190 sets the control port Vctrl2 of the second RF switch 160 to 'High' and sets the other control port Vctrl1 to 'Low' so that the second RF switch 160 is switched to the second diplexer 130. If the tri-mode phone is set to a GPS mode, the controller 190 sets the control port Vc3 of the first RF switch 110 to 'High' and sets the other control ports Vc1 and Vc2 to 'Low' so that the first RF switch 110 is switched to the GPS RF switch 140.

An operation of the tri-mode phone will now be described with reference to FIG. 2. When the tri-mode phone is set to a PCS mode, the first RF switch 110 and the second RF switch 160 are switched to the first diplexer 120 under the control of the controller 190. In this case, a signal received via the antenna 100 is applied to the first diplexer 120 via the first RF switch 110, and then separated by the first diplexer 120. If the signal separated by the first diplexer 120 is a PCS signal, the PCS signal is applied to the PCS duplexer 150 to perform a calling function. If the signal separated by the first diplexer 120 is a TV signal, the TV signal is applied to the TV tuner 180 via the second RF switch 160 to perform a TV reception function. Meanwhile, if the tri-mode phone is set to a CDMA mode, the first RF switch 110 and the second RF switch 160 are switched to the second diplexer 130 under the control of the controller 190. In this case, a signal received via the antenna 100 is applied to the second diplexer 130 via the first RF switch 110 and then separated by the second diplexer 130. If the signal separated by the second diplexer 130 is a CDMA signal, the CDMA signal is applied to the CDMA duplexer 170 to perform a calling function. If the signal separated by the second diplexer 130 is a TV signal, the TV signal is applied to the TV tuner 180 via the second RF switch 160 to perform a TV reception function. In addition, if the tri-mode phone is set to a GPS mode, the first RF switch 110 is switched to the GPS RF switch 140 under the control of the controller 190. In this case, if a signal received via the antenna 100 is a GPS signal, the GPS signal is applied to the GPS RF switch 140 via the first RF switch 110 to perform a corresponding GPS function.

Figure 5:
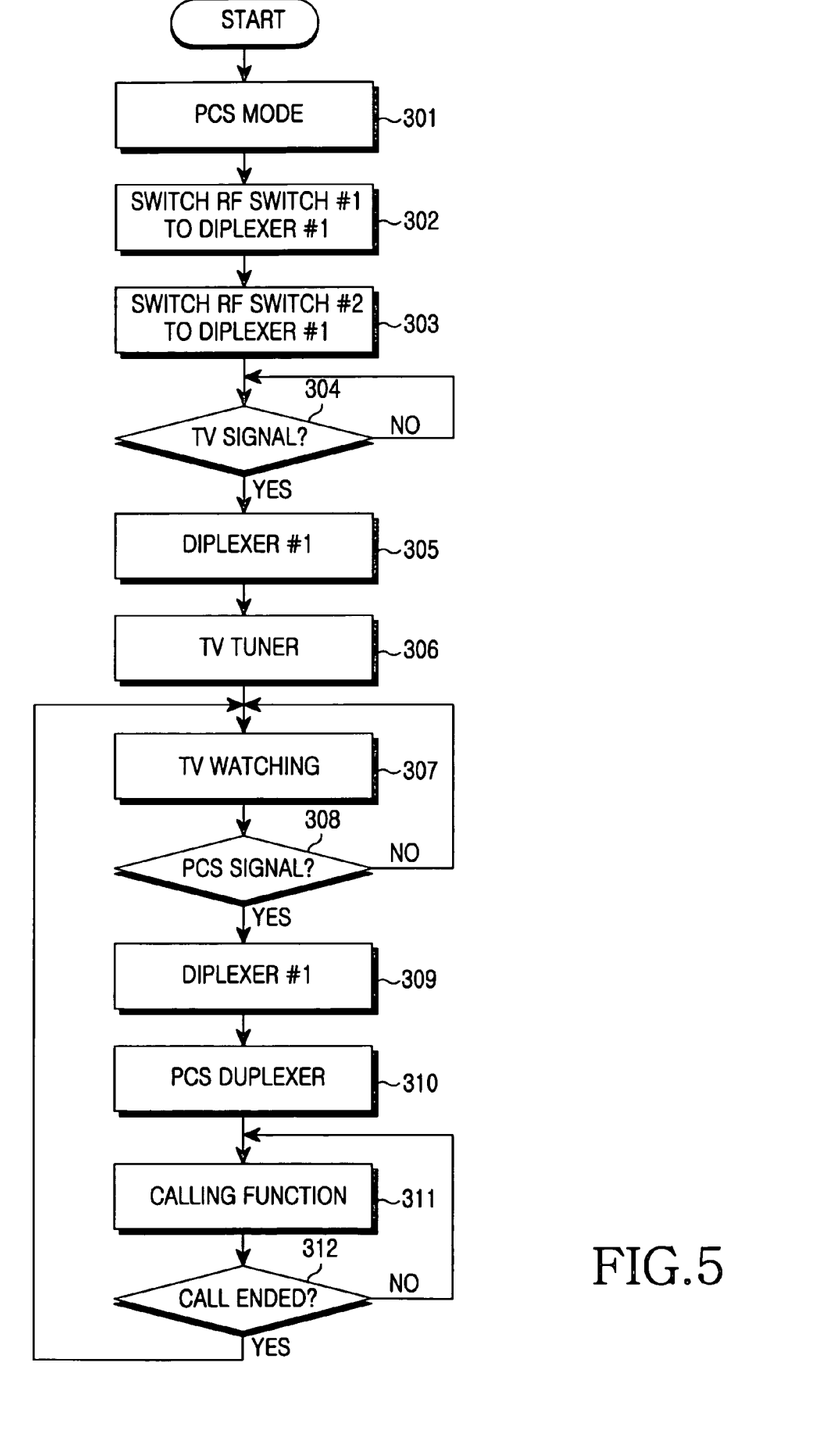
FIG. 5 is a flowchart illustrating an example of a procedure for simultaneously performing a TV reception function and a calling function in a PCS mode in a tri-mode phone according to an embodiment of the present invention.

FIG. 5 is a flowchart illustrating an example of a procedure for simultaneously performing a TV reception function and a calling function in a PCS mode in a tri-mode phone according to an embodiment of the present invention.

An embodiment of the present invention will now be described in detail with reference to FIGS. 2 and 5.

If the tri-mode phone is set to a PCS mode in step 301, the controller 190 proceeds to step 302 where it sets the control ports Vc1, Vc2 and Vc3 of the first RF switch 110 to 'High', 'Low' and 'Low', respectively so that the input port P1 of the first RF switch 110 is switched to the output port P2 connected to the first diplexer 120. Thereafter, in step 303, the controller 190 sets the control ports Vctrl1 and Vctrl2 of the second RF switch 160 to 'Low' and 'High', respectively so that the input port P5 of the second RF switch 160, connected to the TV tuner 180, is switched to the output port P6 which is connected to the first diplexer 120.

If a user of the tri-mode phone sets a TV reception mode through key manipulation, the controller 190 detects a TV signal received from the antenna 100 in step 304. In step 305, the TV signal is applied to the first diplexer 120 via the first RF switch 110, and the first diplexer 120 separates the TV signal and provides the separated TV signal to the second RF switch 160. In step 306, the TV signal applied to the second RF switch 160 is provided to the TV tuner 180. In step 307, the TV tuner 180 enables the user to watch TV.

If a PCS signal is received while the user is watching TV in step 307, the controller 190 perceives this in step 308, and then proceeds to step 309. In step 309, the PCS signal is applied to the first diplexer 120 via the first RF switch 110, and in step 310, the first diplexer 120 separates the PCS signal and provides the separated PCS signal to the PCS duplexer 150. In step 311, the PCS duplexer 150 performs a calling function with the received PCS signal. If a call is ended, the controller 190 perceives this in step 312, and then returns to step 307 to enable the user to continuously watch TV.

Figure 6:
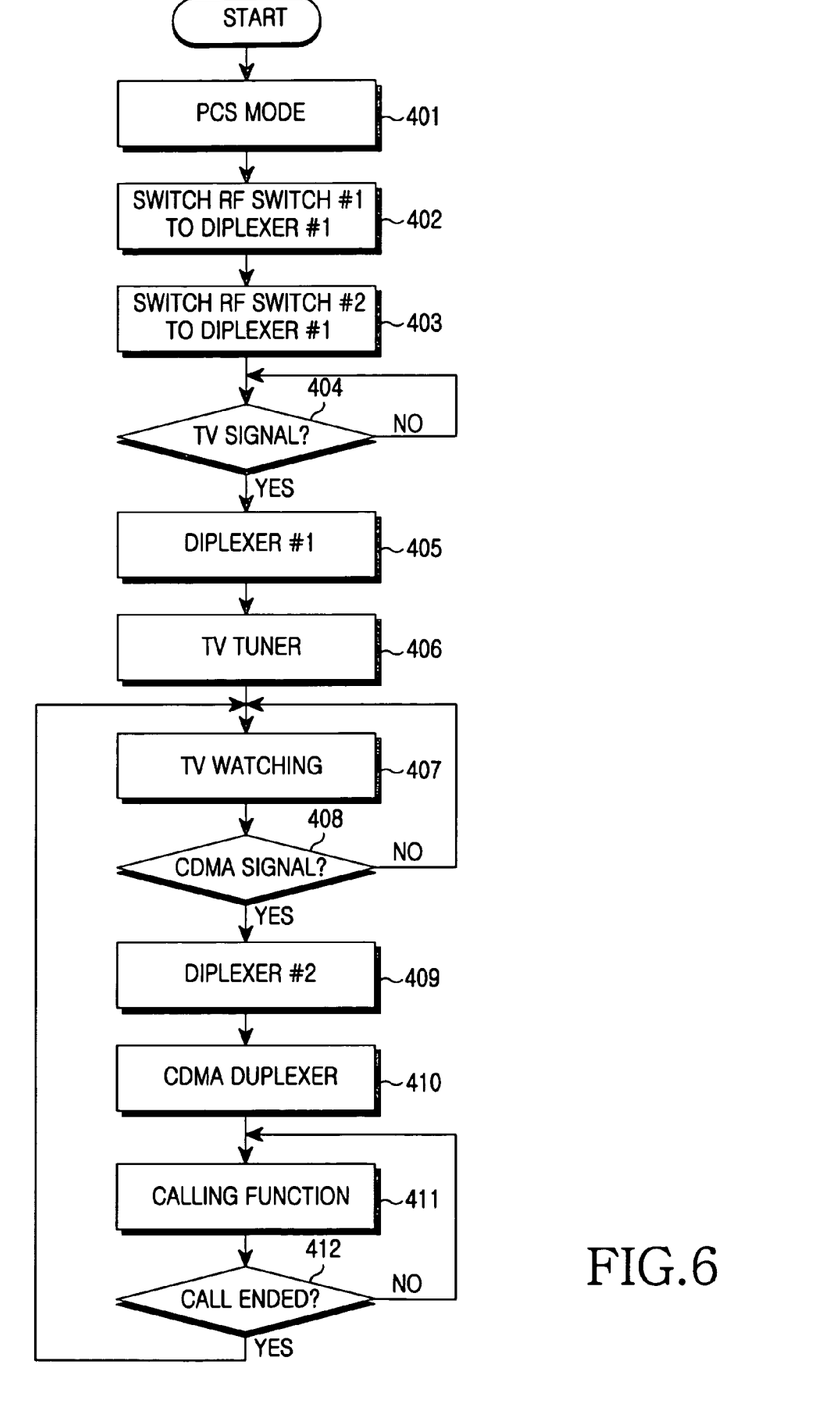
FIG. 6 is a flowchart illustrating an example of a procedure for simultaneously performing a TV reception function and a calling function in a CDMA mode in a tri-mode phone according to an embodiment of the present invention.

FIG. 6 is a flowchart illustrating an example of a procedure for simultaneously performing a TV reception function and a calling function in a CDMA mode in a tri-mode phone according to an embodiment of the present invention.

An embodiment of the present invention will now be described in detail with reference to FIGS. 2 and 6.

If the tri-mode phone is set to a CDMA mode in step 401, the controller 190 proceeds to step 402 where it sets the control ports Vc1, Vc2 and Vc3 of the first RF switch 110 to 'Low', 'High' and 'Low', respectively so that the input port P1 of the first RF switch 110 is switched to the output port P3 connected to the second diplexer 130. Thereafter, in step 403, the controller 190 sets the control ports Vctrl1 and Vctrl2 of the second RF switch 160 to 'Low' and 'High', respectively so that the input port P5 of the second RF switch 160, connected to the TV tuner 180, is switched to the output port P7 which is connected to the second diplexer 130.

If the user of the tri-mode phone sets a TV reception mode through key manipulation, the controller 190 detects a TV signal received from the antenna 100 in step 404. In step 405, the TV signal is applied to the second diplexer 130 via the first RF switch 110 and the second diplexer 130 separates the TV signal and provides the separated TV signal to the second RF switch 160. In step 406, the TV signal applied to the second RF switch 160 is provided to the TV tuner 180. In step 407, the TV tuner 180 enables the user to watch TV.

If a CDMA signal is received while the user is watching TV in step 407, the controller 190 perceives this in step 408, and then proceeds to step 409. In step 409, the CDMA signal is applied to the second diplexer 130 via the first RF switch 110, and in step 410, the second diplexer 130 separates the CDMA signal and provides the separated CDMA signal to the CDMA duplexer 170. In step 411, the CDMA duplexer 170 performs a calling function with the received CDMA signal. If the user ends a call, the controller 190 perceives this in step 412, and then returns to step 407 to enable the user to continuously watch TV.

In the embodiment of the present invention, when the tri-mode phone is set to a GPS mode, the controller 190 sets the control ports Vc1, Vc2 and Vc3 of the first RF switch 110 to 'Low', 'Low' and 'High', respectively so that the input port P1 of the first RF switch 110 is switched to the output port P4 which is connected to the GPS RF switch 140. In this case, if a signal received from the antenna 100 is a GPS signal, the GPS signal is applied to the GPS RF switch 140 via the first RF switch 110 to perform a corresponding GPS function.

Figure 7A:
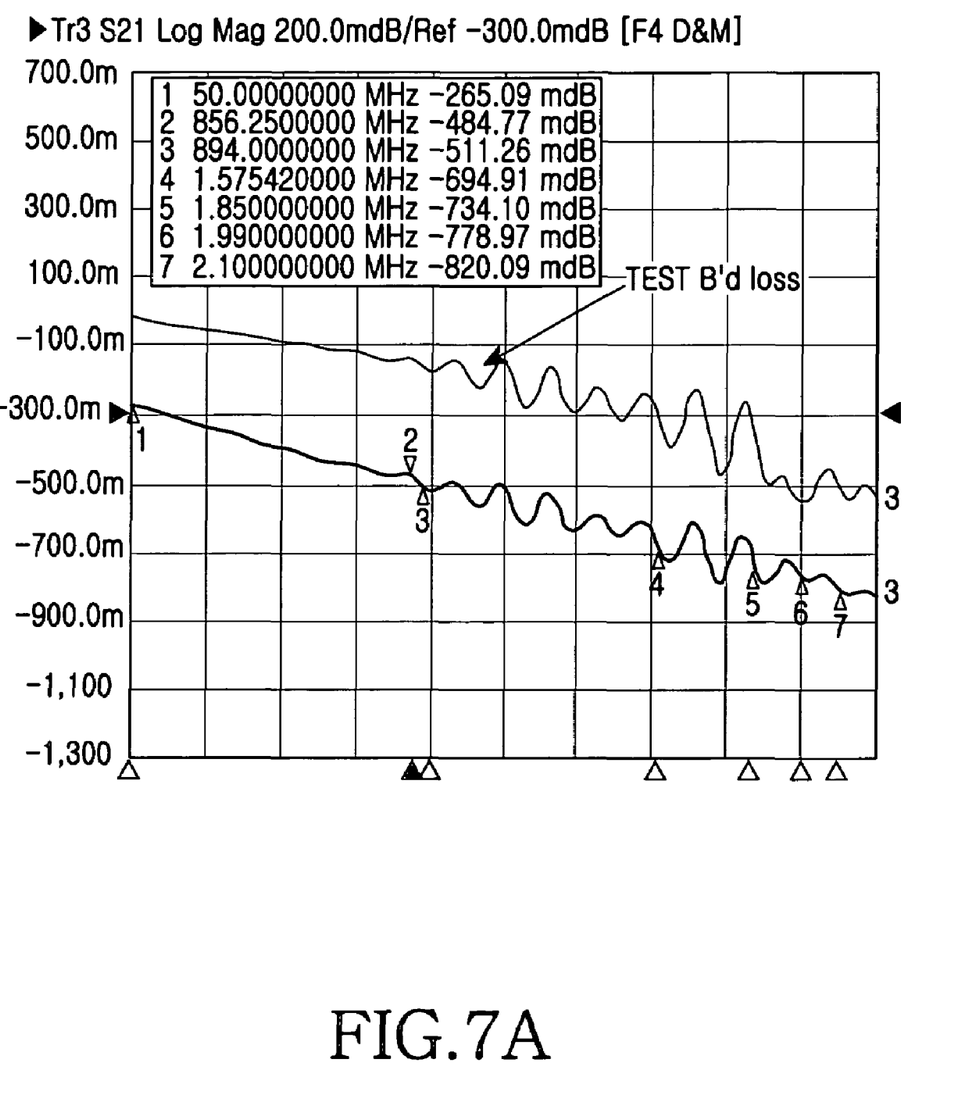
FIG. 7A is a graph illustrating an example of insertion loss occurring in a PCS mode of FIG. 5 according to an embodiment of the present invention.
Figure 7B:
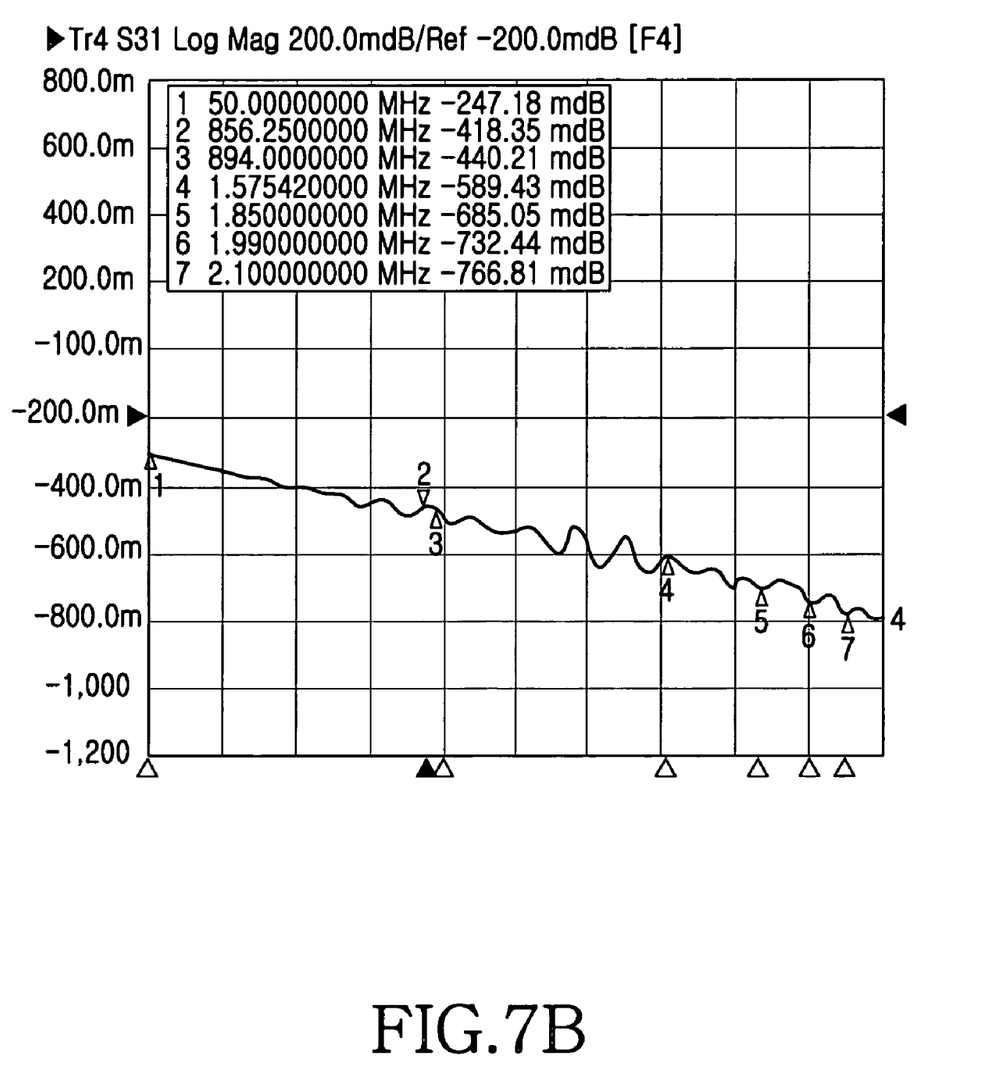
FIG. 7B is a graph illustrating an example of insertion loss occurring in a CDMA mode of FIG. 6 according to an embodiment of the present invention.
Figure 7C:
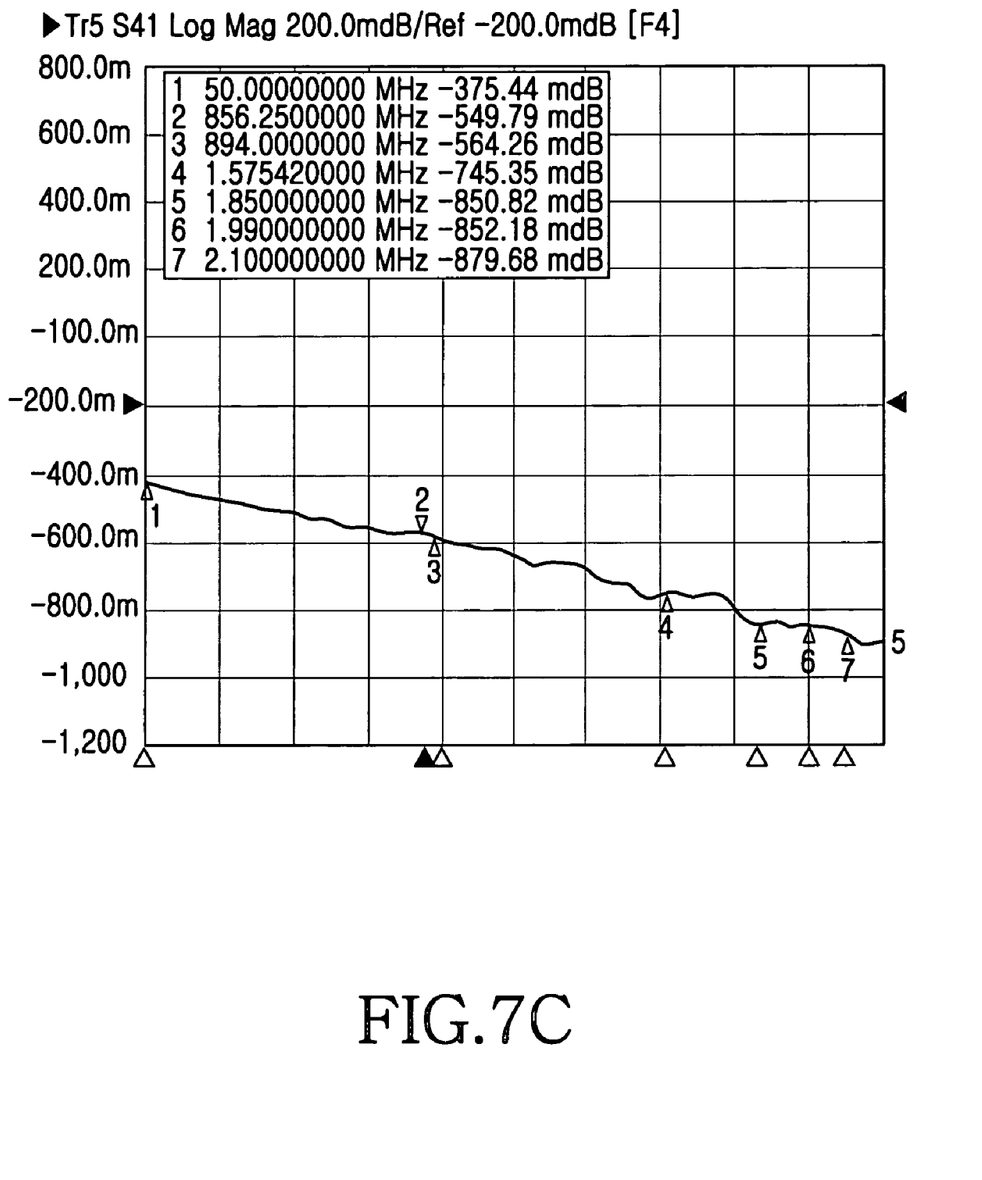
FIG. 7C is a graph illustrating an example of insertion loss occurring in a GPS mode according to an embodiment of the present invention.

FIG. 7A is a graph illustrating an example of insertion loss occurring in a PCS mode of FIG. 5 according to an embodiment of the present invention. Specifically, FIG. 7A illustrates insertion loss occurring where the input port P1 of the first RF switch 110 is switched to the output port P2. FIG. 7B is a graph illustrating an example of insertion loss occurring in a CDMA mode of FIG. 6 according to an embodiment of the present invention. Specifically, FIG. 7B illustrates insertion loss occurring where the input port P1 of the first RF switch 110 is switched to the output port P3. FIG. 7C is a graph illustrating an example of insertion loss occurring in a GPS mode 6 according to an embodiment of the present invention. Specifically, FIG. 7C illustrates insertion loss occurring where the input port P1 of the first RF switch is switched to the output port P4. It can be understood from FIGS. 7A to 7C that the insertion loss is not high, i.e., 0.25 dB at the minimum.

As described above, the tri-mode phone capable of supporting two or more communication services employs RF switches for separating the communication services and diplexers for separating a telephone call signal and a TV signal, thereby simultaneously performing a TV reception function and a calling function with a single antenna. As a result, the invention contributes to a reduction in size and cost of the products.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for simultaneously performing a TV reception function and a calling function in a multimode mobile phone supporting two or more communication services, comprising:
   a first Radio Frequency (RF) switch for separating a received signal into N communication services, where $N \geq 3$;
   M diplexers associated with the communication services, for separating a signal received from the first RF switch into a call signal and a TV signal, where $M \geq 2$;
   a second RF switch for applying the TV signal received from the diplexers to a TV tuner; and
   a controller for controlling an overall operation of the multimode mobile phone and controlling the first RF switch and the second RF switch according to the received signal.

2. The apparatus of claim 1, wherein the first RF switch includes one input port, N output ports, and N control ports.

3. The apparatus of claim 1, wherein the second RF switch includes one input port, M output ports associated with the diplexers, and M control ports.

4. The apparatus of claim 1, wherein the communication services comprises at least one of a Code Division Multiple Access (CDMA) service, a Personal Communications Service (PCS) service and a Global Positioning System (GPS) service.

5. The apparatus of claim 1, wherein the TV signal comprises an audio and video signal.

6. An apparatus for simultaneously performing a TV reception function and a calling function in a tri-mode mobile phone capable of supporting a Code Division Multiple Access (CDMA) service, a Personal Communications Service (PCS) service and a Global Positioning System (GPS) service, the apparatus comprising:
   a first Radio Frequency (RF) switch for switching a received signal to a first diplexer, a second diplexer or a GPS RF switch;
   the first diplexer for separating a signal received via the first RF switch into a PCS signal and a TV signal;
   the second diplexer for separating a signal received via the first RF switch into a CDMA signal and a TV signal; and
   a second RF switch for switching the TV signal from the first diplexer and the second diplexer to a TV tuner.

7. The apparatus of claim 6, wherein the first RF switch includes one input port, three output ports, and three control ports.

8. The apparatus of claim 6, wherein the second RF switch includes one input port, two output ports, and two control ports.

9. The apparatus of claim 6, wherein in a PCS mode, the first RF switch is switched to the first diplexer; the first diplexer applies a signal received from the first RF switch to a PCS duplexer if the received signal is a PCS signal, and applies the received signal to a TV tuner via the second RF switch if the received signal is a TV signal; and the second RF switch is switched to the first diplexer and applies the received TV signal to the TV tuner.

10. The apparatus of claim 6, wherein in a CDMA mode, the first RF switch is switched to the second diplexer; the second diplexer applies a signal received from the first RF switch to a CDMA duplexer if the received signal is a CDMA signal, and applies the received signal to a TV tuner via the second RF switch if the received signal is a TV signal; and the second RF switch is switched to the second diplexer and applies the received TV signal to the TV tuner.

11. The apparatus of claim 6, wherein in a GPS mode, the first RF switch is switched to a GPS RF switch.

12. The apparatus of claim 6, wherein the TV signal comprises a video signal and an audio signal.

13. The apparatus of claim 6, wherein the TV signal can be viewed and listened to via a screen and speaker of the tri-mode mobile phone.

14. The apparatus of claim 6, wherein the tuner selectively selects a channel from the TV signal.

15. A method for simultaneously performing a TV reception function and a calling function in a multimode mobile phone supporting two or more communication services, comprising the steps of:

separating a received signal into a corresponding communication services using a Radio Frequency (RF) switch;

separating the communication services using diplexers into a call signal and a TV signal, and performing at least one of a calling function and a TV reception function.

16. The method of claim 15, further comprising:
enabling watching of TV on the multimode mobile phone when a phone call is not in session.

17. The method of claim 15, wherein the calling function and the TV reception function are simultaneously performed by receiving the call signal and the TV signal.

18. A method for simultaneously performing a TV reception function and a calling function in a tri-mode mobile phone including a first Radio Frequency (RF) switch for switching a received signal to a first diplexer, a second diplexer or a GPS RF switch, the first diplexer for separating a signal received from the first RF switch into a PCS signal and a TV signal, the second diplexer for separating a signal received from the first RF switch into a CDMA signal and a TV signal, and a second RF switch for switching the TV signal from the first and second diplexers to a TV tuner, the tri-mode mobile phone being capable of supporting a Code Division Multiple Access (CCDMA) service, a Personal Communications Service (PCS) service and a Global Positioning System (GPS) service, the method comprising the steps of:

receiving a signal in a PCS mode of the tri-mode mobile phone;

if the received signal is a PCS signal, applying the PCS signal to a PCS duplexer via the first diplexer to perform a calling function; and if the received signal is a TV signal, applying the TV signal to the TV tuner via the first diplexer and the second RF switch to perform a TV reception function.

19. The method of claim 18, wherein in a PCS mode, the first and second RF switches are switched to the first diplexer.

20. The method of claim 18, wherein the calling function and the TV reception functions are simultaneously performed by receiving the PCS signal and the TV signal.

21. A method for simultaneously performing a TV reception function and a calling function in a tri-mode mobile phone including a first Radio Frequency (RF) switch for switching a received signal to a first diplexer, a second diplexer or a GPS RF switch, the first diplexer for separating a signal received from the first RF switch into a PCS signal and a TV signal, the second diplexer for separating a signal received from the first RF switch into a CDMA signal and a TV signal, and a second RF switch for switching the TV signal from the first and second diplexers to a TV tuner, the tri-mode mobile phone being capable of supporting a Code Division Multiple Access (CDMA) service, a Personal Communications Service (PCS) service and a Global Positioning System (GPS) service, the method comprising the steps of:

receiving a signal in a CDMA mode of the tri-mode mobile phone;

if the received signal is a CDMA signal, applying the CDMA signal to a CDMA duplexer via the second diplexer to perform a calling function; and if the received signal is a TV signal, applying the TV signal to the TV tuner via the second diplexer and the second RF switch to perform a TV reception function.

22. The method of claim 21, wherein in a CDMA mode, the first and second RF switches are switched to the second diplexer.

23. The method of claim 21, wherein the calling function and the TV reception functions are simultaneously performed by receiving the CDMA signal and the TV signal.

24. The method of claim 21, wherein the TV signal comprises an audio and video signal.

* * * * *